United States Patent
Shimada et al.

(10) Patent No.: US 6,868,390 B1
(45) Date of Patent: Mar. 15, 2005

(54) BUSINESS SUPPORT SYSTEM

(75) Inventors: Takashi Shimada, Kawasaki (JP); Kiyofumi Akita, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/679,068

(22) Filed: Oct. 5, 2000

Related U.S. Application Data (63) Continuation of application No. PCT/JP99/02642, filed on May 20, 1999.

(30) Foreign Application Priority Data

Jun. 30, 1998 (JP) ............................................ 10-185115

(51) Int. Cl.[7] .............................................. G06F 17/60
(52) U.S. Cl. ........................................ 705/10; 709/250
(58) Field of Search ............................. 705/10, 14, 26; 709/220, 223, 226, 250

(56) References Cited

U.S. PATENT DOCUMENTS

| | | | |
|---|---|---|---|
| 5,758,072 A | * | 5/1998 | Filepp et al. ............... 709/220 |
| 5,930,764 A | * | 7/1999 | Melchione et al. ........... 705/10 |
| 6,182,059 B1 | * | 1/2001 | Angotti et al. ................ 706/45 |

OTHER PUBLICATIONS

Dudley, Roy M. "Marketing Telecommunications Equipment Using the World Wide Web." Telecommunications Americas Edition Telecommunications, vol. 29, No. 11, pp. 41–44, Nov. 1995.*

* cited by examiner

Primary Examiner—Susanna M. Diaz
(74) Attorney, Agent, or Firm—Staas & Halsey LLP (57) ABSTRACT

A business support system producing service information request data for an external processing system in a predetermined form in response to a request from a terminal and converting the form of the service information request data into a format that can be processed by the external processing system. The service information provided from the external processing system in response to the service information request data is converted into the predetermined format. The service information converted to the predetermined format is provided to the terminal originating the request. According to the present invention, the most recent information processed by an existing external processing system is provided to a user terminal and information is exchanged between the user terminal and the external processing system.

11 Claims, 10 Drawing Sheets

BUSINESS SUPPORT SYSTEM

This is a continuation of International Application PCT/JP99/02642, with an international filing date of May 20, 1999, published in English under PCT Article 21(2).

FIELD OF THE INVENTION

The present invention relates to a business support system, and more particularly, to a business support system that can connect existing external processing systems such as bank settlement systems, securities firm host computers, and data warehouses and the like with a variety of terminal apparatuses (channels) and provide the latest existing system data to the most appropriate terminal apparatus used by a customer, and can also provide information from the terminal apparatus to an existing processing system determined by the customer.

DESCRIPTION OF RELATED ART

Figure 1:
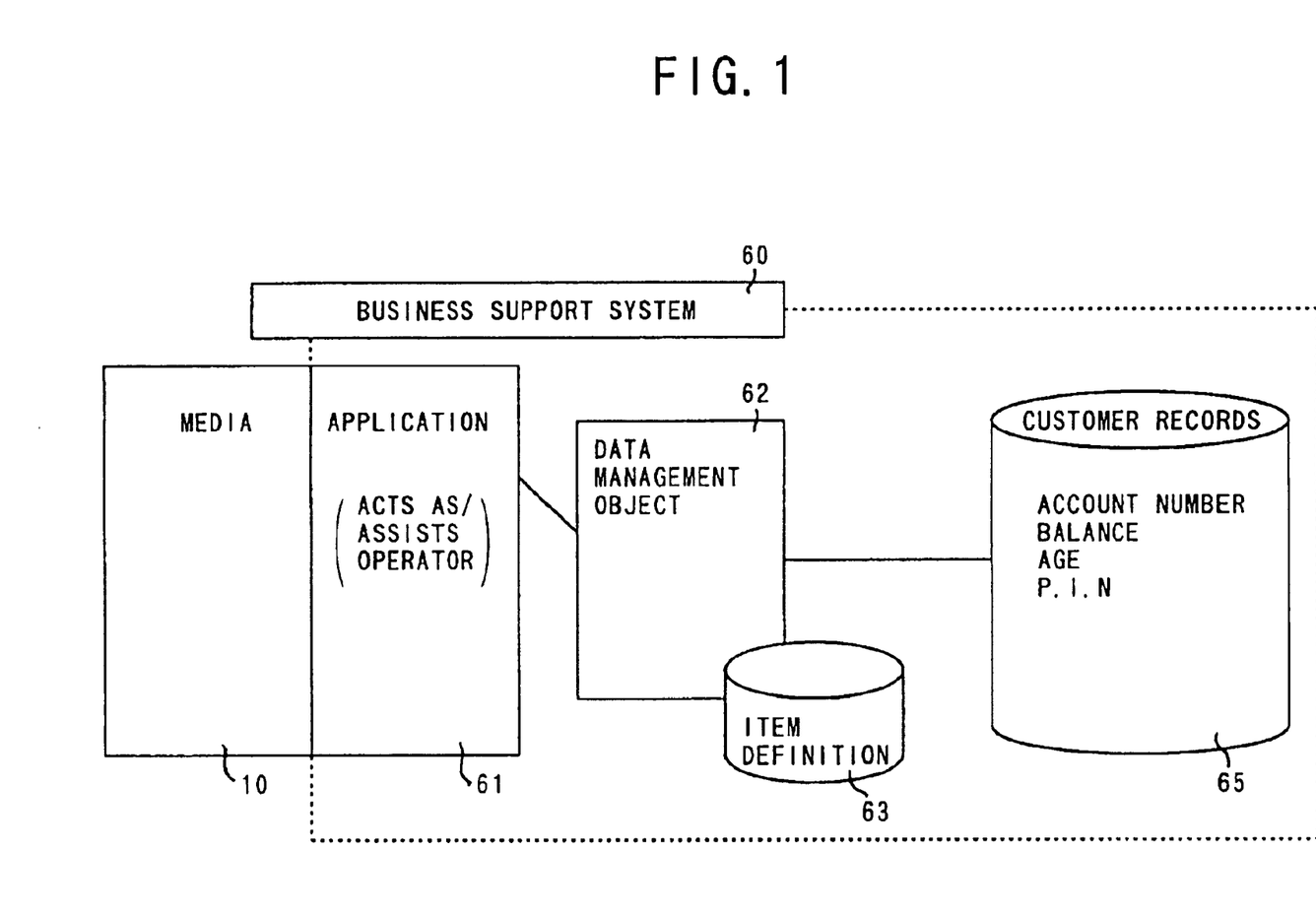
FIG. 1 is a block diagram of a conventional example of a business support system.

Conventionally, a business support system like that for example shown in FIG. 1 has been provided. This business support system 60 is set up at a bank telephone center and the like and is connected to media 10 such as a telephone and to a computer terminal apparatus located on the floor of the bank, and is configured to provide a variety of types of service information to the media 10.

The business support system 60 includes an application 61 for taking the place of and/or providing support to a live banking-services operator, a data management object for collecting and managing data 62, an item definition unit 63 that defines the location of each piece of data, and a database 65 of service information such as customer information on each customer.

If the data relating to the request is within the data management object 62, then the data management object 62 returns that data as is to the application 61. If, however, the data relating to the request is not within the data management object 62, then the item definition unit 63 is checked and data (an account balance) relating to the request is extracted from the database 63 and is read into the data management object 62 and sent to the application 61.

When the application 61 obtains data relating to the request from the data management object 62, it sends that data onward to the requesting media 10. As a result, a user using that media 10 can access account balance and other service information via the media 10.

However, in the conventional business support system described above, the customer information database 65 is normally batch-processed on a weekly or monthly basis or delay-processed, in which the database is updated with information gathered from the bank's settlement system and/or one or more data warehouses. Accordingly, the conventional business support system cannot provide the latest information in response to a request from a customer using the media 10 because the information it has may differ from the information actually available in the bank's settlement system.

Additionally, the conventional business support system is not directly connected to the external processing systems such as the bank settlement system or data warehouse, so operations that are to be carried out with the bank's settlement system, such as transfers and payments or loan applications, must be carried out using a different system.

DISCLOSURE OF THE INVENTION

The present invention has as its general object to provide an improved and useful business support system in which the above-described disadvantages are eliminated.

A more specific object of the present invention is to provide a business support system capable of providing the latest information available in an existing external processing system to a terminal apparatus used by a user and also capable of exchanging information between a terminal apparatus and an external processing system.

In order to achieve the above-described objects, the business support system according to the present invention has a service request production means for 1 producing service information request data in a predetermined form for an external processing system in response to a request from a terminal apparatus, a data form conversion means for converting the form of the service information request data produced by the service request production means into a form that can be processed by the external processing system and also for converting service information provided from the external processing system in response to said service information request data into said predetermined form, and a service information providing means for providing the service information converted into the predetermined form by the data form conversion means to the terminal apparatus originating the request for service information.

In the above-described business support system, when service information request data is input from a terminal apparatus by operation of a customer, service information request data in a predetermined form is produced and converted into a form (protocol) capable of being processed by an external processing system. The external processing system then transmits service information in response to the service information request data from the business support system. This returned service information is converted into the above-mentioned form (protocol) and provided to the terminal apparatus from which the service information request originated.

According to the above-described system, service information request data is provided to the external processing system in a form that can be processed by the external processing system, and also service information in the form particular to the external processing system that is sent back from the external processing system in response to a service information request data is converted into a predetermined form. Accordingly, the external processing system can be connected regardless of the I/O relation of the external processing system to the business support system. The business support system can then provide the latest service information from the external processing system to the terminal apparatus originating the request as information from a hypothetical database.

Additionally, this business support system is connected to the external processing system, so it can support information exchange between the external processing system and the terminal apparatus.

In terms of being able to provide appropriate service information to customers, the present invention can be configured to further comprise campaign monitoring means for monitoring the rate at which an advertising campaign generates successful sales based on service information provided to customers as well as service information determining means for determining which type of service information should be provided to customers in response to the monitored campaign sales success rate.

Additionally, in terms of being able to provide service information via means which are convenient for the customer to use, the present invention can be configured to further comprise service channel determining means for determining which type of service information should be provided to customers in response to the monitored campaign sales success rate.

Further, in terms of not overloading the service information providing means, the present invention can be configured to comprise adjusting means for making sure that a service information providing means determined by the service channel determining means do not concentrate on a particular type of service information.

BRIEF DESCRIPTION OF THE DRAWINGS

Other objects, features and advantages of the present invention will become more apparent from the following detailed description when read in conjunction with the accompanying drawings.

PREFERRED EMBODIMENT FOR PRACTICING THE INVENTION

A description will now be given of a preferred embodiment for practicing the present invention, with reference to the drawings.

Figure 2:
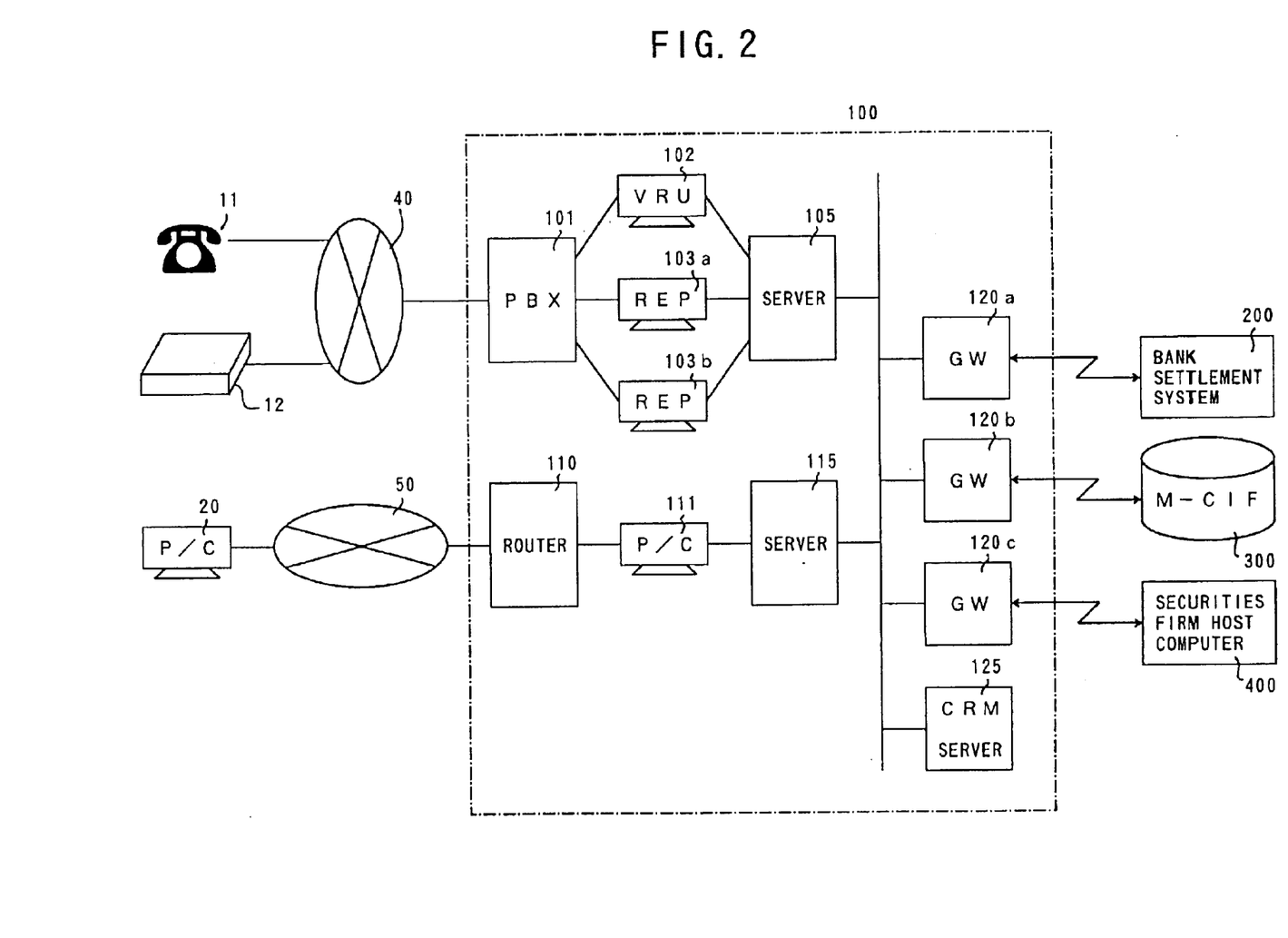
FIG. 2 is a hardware block diagram of a business support system according to one embodiment of the present invention.

FIG. 2 is a hardware block diagram of a business support system according to one embodiment of the present invention. This business support system may, for example, be set up at a bank's telephone banking center. In FIG. 2, this business support system 100 has a private branch exchange (PBX) 101, a Voice Response Unit (VRU) 102, operator terminals 103a, 103b, and a server 105. A telephone 11 and a facsimile machine 12 are connected to the PBX 101 via an open public network. The PBX 101 in principle connects an incoming call from the telephone 11 to the VRU 102. Additionally, the PBX 101 is equipped with an automatic call distribution (ACD) function, so incoming external calls are distributed between the operator terminals 103a, 103b according to a predetermined algorithm. The VRU 102 and operator terminals 103a, 103b are connected to the server 105 so that each is able to utilize information stored in the server 105. The operator terminals 103a, 103b have built-in telephony application programming interface (TAPI) units, such that the operators can operate the operator terminals 103a, 103b while conversing with customers via the built-in TAPI units.

This business support system 100 further has a router 110, a reception terminal 111 and a server 115. A computer terminal 20 (including both home personal computers as well as so-called kiosk outlet terminals) is connected to the router 110 via a data communications network 50 such as the internet. The reception terminal 111 connected to other computer terminals on the data communications network 50 via the router 110 is also connected to the server 115 and can use the information on the server 115.

This business support system 100 further has gateways 120a, 120b and 120c. These gateways 120a, 120b and 120c-are connected both to the above-described servers 105, 115 and to a local area network (LAN). External processing systems such as a bank settlement system host computer 200, a data warehouse database (M-CIF) 300, and a securities firm host computer 400 are connected to each of the gateways 120a, 120b and 120c. Data processed within the business support system 100 is provided to the above-described bank settlement system host computer 200, data warehouse database (M-CIF) 300 and securities firm host computer 400, via the gateways 120a, 120b and 120c, and also data from the above-described bank settlement system host computer 200, data warehouse database (M-CIF) 300 and securities firm host computer 400 is read into the business support system 100 via the gateways 120a, 120b and 120c.

Additionally, a CRM 39 server 125 containing member (customer) information is connected to the LAN. The data inside the CRM server 1245 can be utilized from the operator terminals 103a, 103b and the reception terminals 111 via the servers 105, 115.

Figure 3:
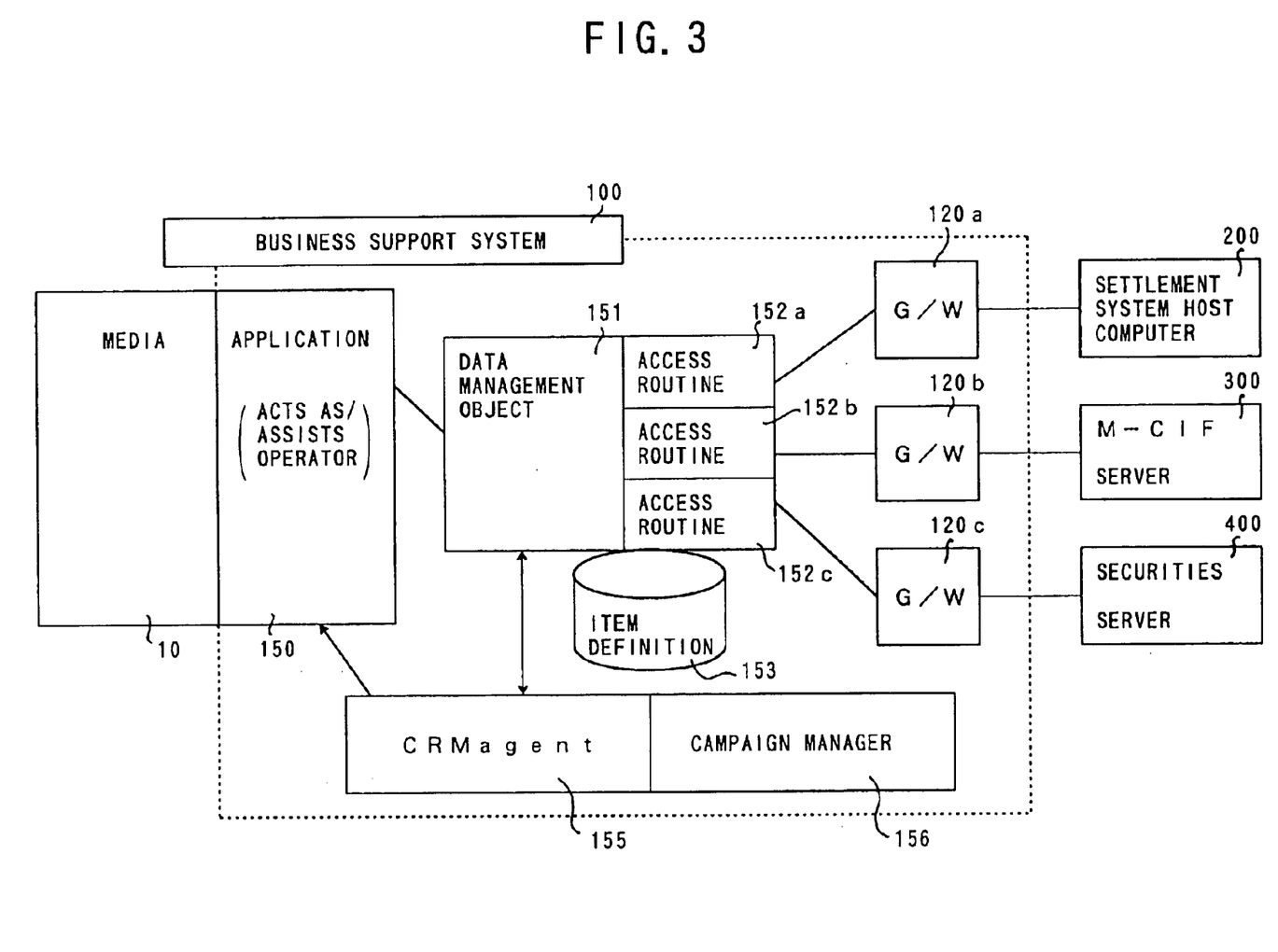
FIG. 3 is a functional block diagram of a business support system according to one embodiment of the present invention.

The business support system 100 having the hardware configuration described above may have a functional configuration such as that shown in FIG. 3.

In other words, functionally, the business support system 100 is linked to the above-described media such as the telephone 11, facsimile machine 12 and computer terminal 20, an application 150 that takes the place of or augments the work of an operator in providing service information to customers, a data management object 151 that manages the collection of data and the provision of data to customers, access routines 152a, 152b and 152c that access external processing systems (such as the bank settlement system host computer 200, data warehouse database (M-CIF) 300 and securities firm host computer 400 described above), an item definition 153 in which is inscribed the relation between each data item and the access routine that obtains the data, and gateways 102a, 120b and 120c that convert protocols. Additionally, a CRM agent 155 and a campaign manager 156 are provided for the purpose of providing various types of sales campaign information (regarding pensions, new types of fixed-term products, loans, securities and so forth).

The above-described application 150, data management object 151, access routines 152a–152c, definition item 153, CRM agent 155 and campaign manager 156, are configured as the functions of the operator terminals 103a, 103b and servers 105, 115.

The above-described CRM agent 155 exchanges information with the data management object 151, generates sales campaign information based on the latest information in the data management object 151 and provides it to the application 150. The campaign manager 156 manages operations concerning the sales campaign information which should be gathered by the CRM agent 155 as well as the media 10 (terminal apparatus) to which the information is provided, and may for example be configured as shown in FIG. 4.

Figure 4:
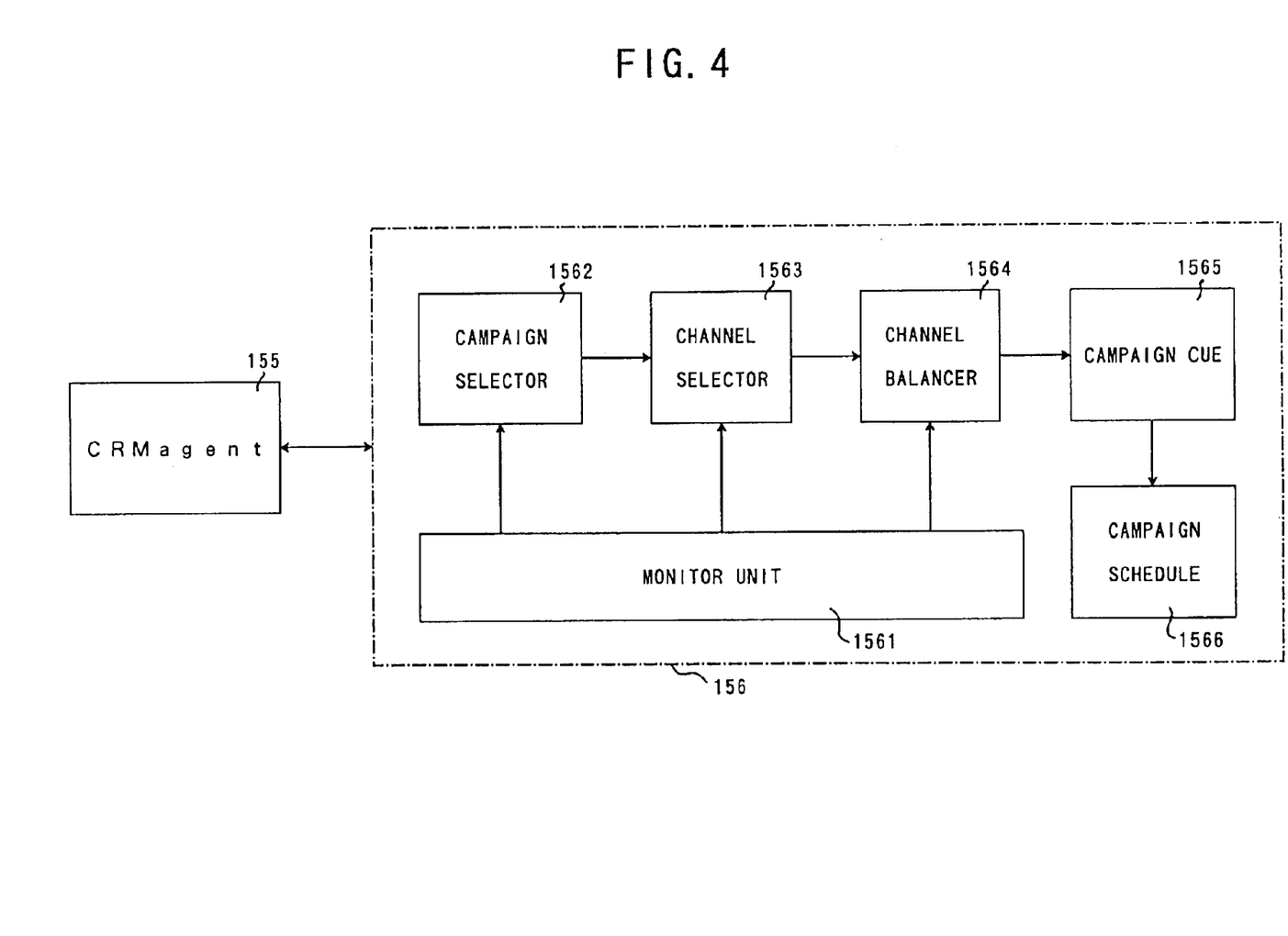
FIG. 4 is a detailed functional block diagram of a campaign manager.

In FIG. 4, the campaign manager 156 is composed of a monitor unit 1561, a campaign selector 1562, a channel selector 1563 and a channel balancer 1564, a campaign cue 1565 and a campaign scheduler 1566. The monitor unit 1561 monitors the success rate of each sales campaign and the success rate of each channel (media). The results of this monitoring are used in advertisement campaign scheduling and channel load adjustment.

The campaign selector 1562 calculates the potential value of customers (segmenting them by age, sex, annual income and so forth) to which the sales campaign is to be directed using such methods as segment analysis and determines which sales campaigns are to be directed to customers on the basis of those potential values.

The channel selector 1563 scores the customer and channel compatibility and determines the best channel for the customer. That is, it determines which channel (electronic mail, direct mail, telephone, etc.) is effective in obtaining a successful sale during a sales campaign for the customer. The scoring is calculated as a sum of several factors, for example.

Channel designation (weighted)

Channel use frequency (weighted) Mining effect (weighted).

"Mining" here refers to analysis of products to be advertised to customers.

The channel balancer 1564 adjusts the channels of the customers to which a sales campaign is to be directed so that no one channel gets overloaded. Initially, it calculates the load rate by determining for each channel on a per-time-unit basis the target number of items to be processed and the scheduled number of items to be processed. Once running, it corrects the parameters based on the per-time-unit processing capacity results gotten from the monitor unit 1561.

The above-described campaign selector 1562, channel selector 1563 and channel balancer 1564 correct their respective determinations based on the success rates for each campaign and each channel obtained from the monitor unit 1561. For example, based on the monitored per-channel success rate, an effective channel (such as electronic mail) can be nearly overloaded while a less effective channel (such as direct mail) can be set to a reduced rate of utilization. This type of adjustment makes it possible to improve the success rate of a sales campaign and to provide effective business support.

Figure 5:
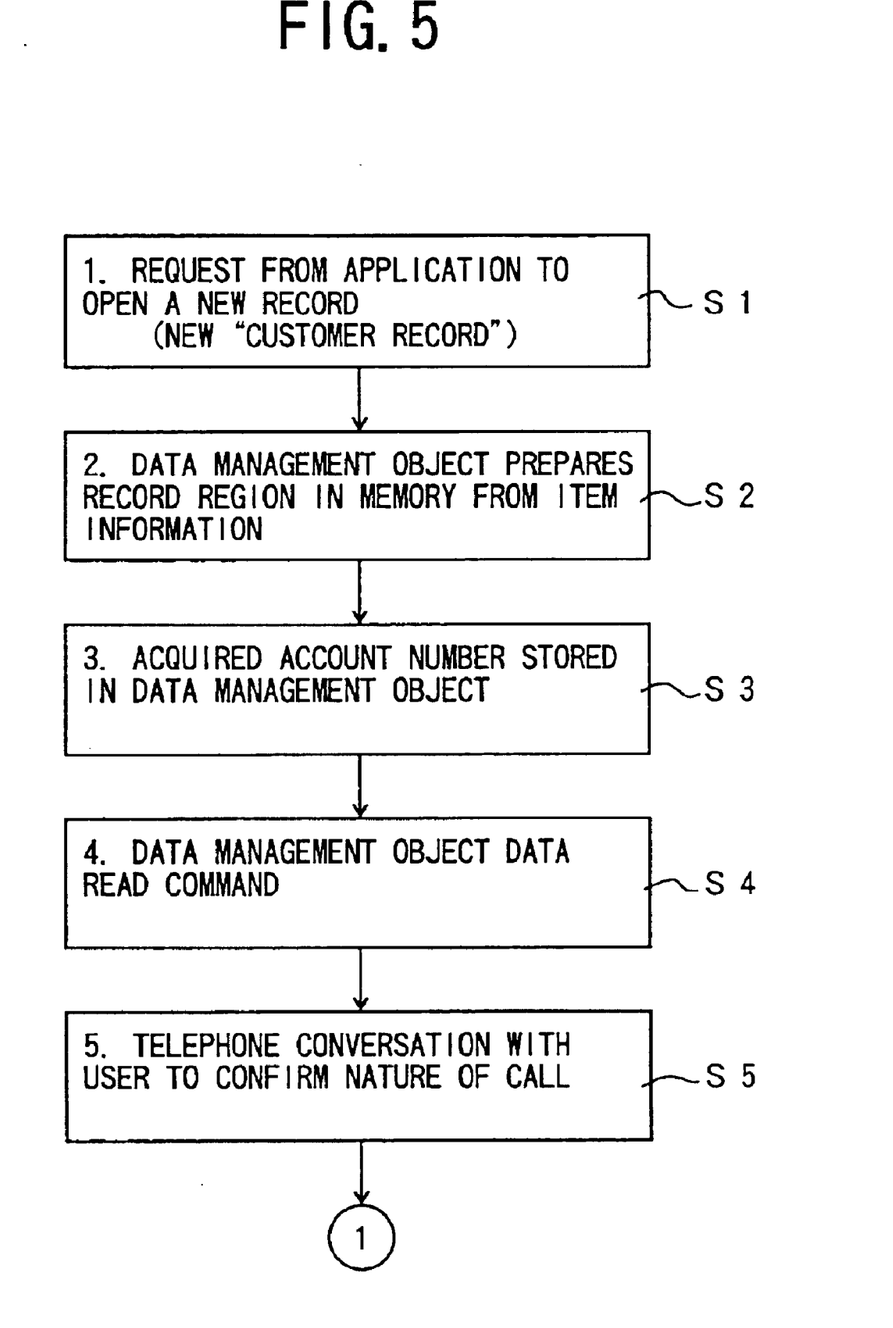
FIG. 5 is a first flow chart of steps in a process performed by the business support system.
Figure 6:
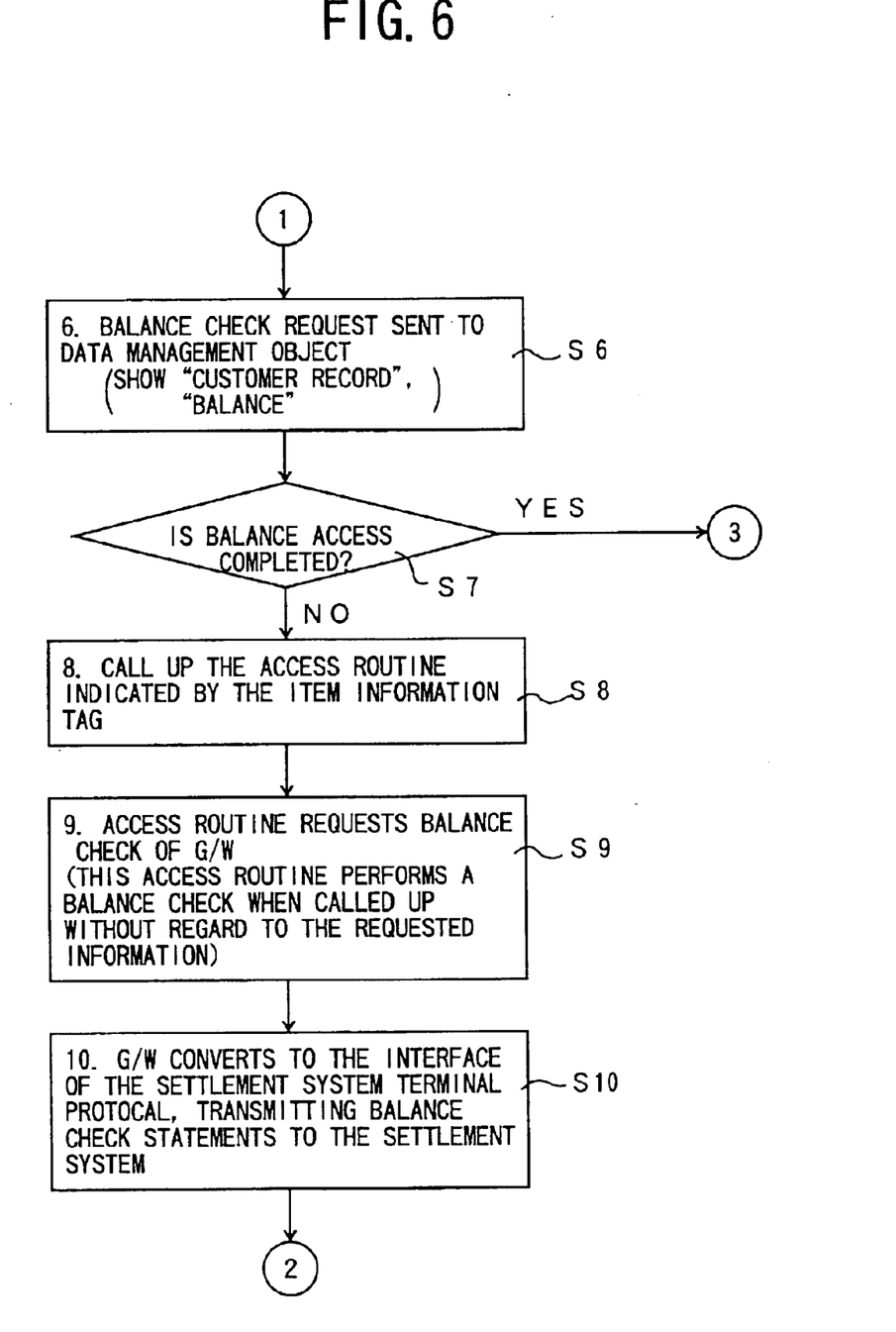
FIG. 6 is a second flow chart of steps in a process performed by the business support system.
Figure 7:
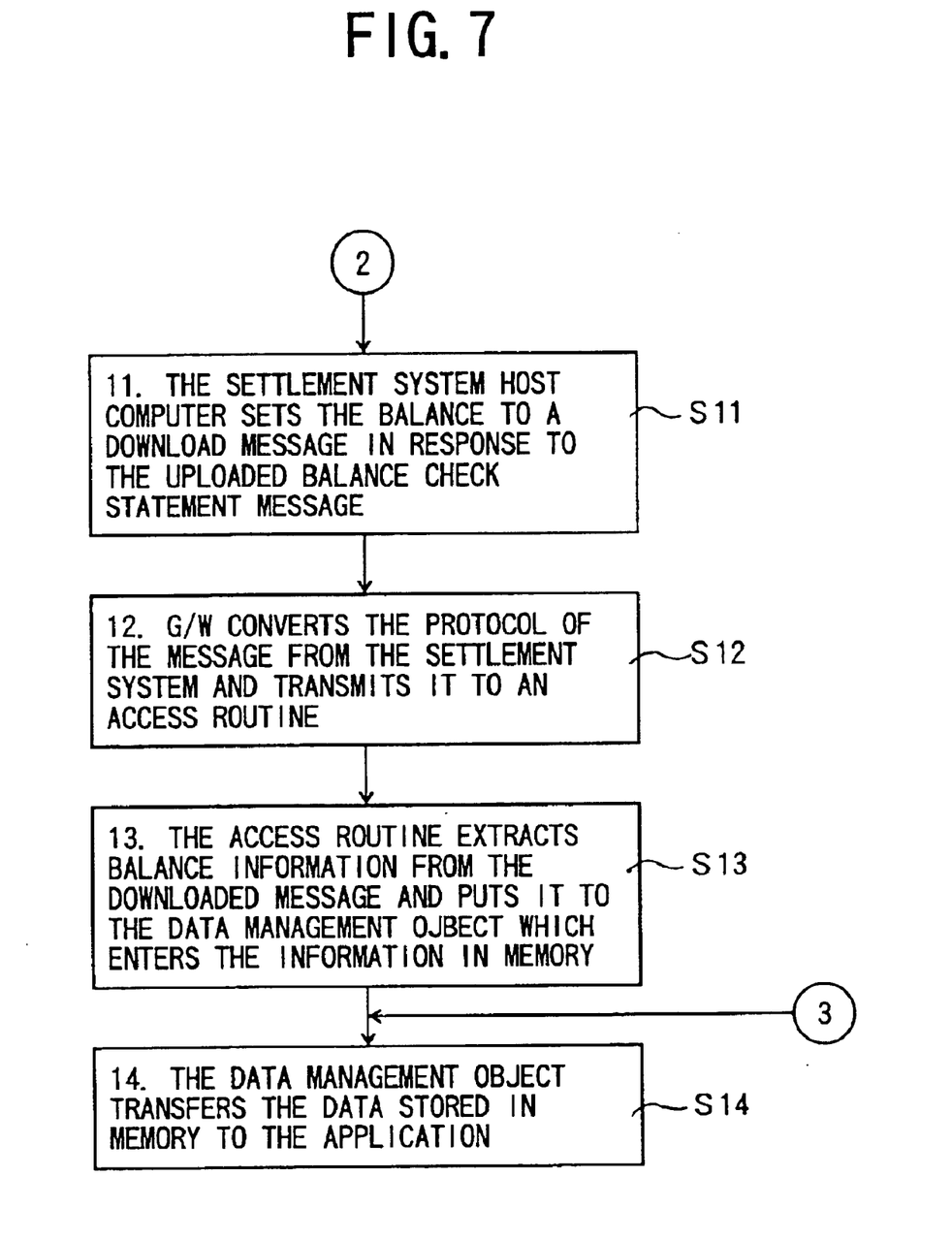
FIG. 7 is a third flow chart of steps in a process performed by the business support system.

In the above-described business support system 100, for example the application 150 may acquire a customer's account balance information based on the customer's account number gotten from the media 10 (a telephone, computer terminal apparatus and so forth), by executing the steps for example shown in FIGS. 5 through 7.

In FIG. 5, when there is a balance inquiry request from the media 10 (for example a computer terminal apparatus), according to that request the application 150 will request that the data management object 151 open a record (step S1). Based on the item information in the item definition 153, the data management object 151 prepares a record region in the memory. The item information has tags that indicate the identity of the item as well as its address (for access routine recognition purposes). The account number received by the application 150 is then stored in the data management object 151. Then, the data management object 151 is given a read command (step S4). When the data management object 151 is given a read command, a telephonic conversation with the user is conducted in parallel with communication with a host computer (step S5).

Thereafter the process proceeds to the steps shown in FIG. 6, in which the application makes a balance inquiry request of the data management object 151 (step S6). The data management object 151 then determines whether or not there has already been an access of the balance regarding this inquiry (step S7) and, if no such access is found, reads out the access routine (152a, 152b or 152c) that shows the tag of the item information in the item definition 153 (step S8). In this case, for example, the access routine 152a for accessing a bank account balance in a bank settlement system 200 is read out.

The read-out access routine 152a makes a balance inquiry request to the corresponding gateway 120a (step S9). It should be noted that this access routine 152a conducts a balance inquiry regardless of the information requested.

Next, the gateway 120a makes an interface conversion to the protocol used to exchange data between the existing bank settlements system 200 and the terminal apparatus (an ATM and the like). Then, a balance inquiry statement is sent up from the gateway 120a to the bank settlement system 200 (step S10).

Thereafter the process moves to the steps shown in FIG. 7, in which, in response to the balance inquiry statement, said settlement system host computer 200 searches for the account balance using the account number included in the uploaded request. The settlement system host computer 200 then sets up a balance statement including the balance obtained, which statement is then downloaded from the settlement system host computer 200 to the business support system 100 (step S11). When this downloaded statement is received at the gateway 120a, this gateway 120a converts the protocol of the downloaded statement and transmits it to the access routine 152a (step S12).

The access routine 152a extracts the information (that is, the balance) from the downloaded statement and supplies that downloaded statement to the data management object 151. Then, that data is stored in the data management object 151 (step S13). Thereafter, the data management object 151 transfers the information in the memory to the application 150 (step S14). The application 150 that has acquired the balance or other information then provides that account balance or other information to the media 10 that originated the request. As a result, the customer can ascertain their account balance at the media 10.

It should be noted that if the data management object 151 determines in the process of step S7 in FIG. 6 that the balance has already been accessed, then the routine proceeds to step S14 in FIG. 7 and data relating to the balance stored in the memory by the previous accession is transferred from the data management object 151 to the application 150.

In the system as described above, data relating to the data management object 151 request is obtained from the external processing system (for example the bank settlement system 200) via the gateways 120a, 120b and 120c that convert the protocol of the data, so it is as if the application 150 can obtain data relevant to said request using the same processes used to obtain data from a conventional database (see FIG. 1). This information is obtained directly from the external processing system (such as the bank settlement system 200), so it is always up to date.

Additionally, by using a gateway, the external processing system (for example the bank settlement system 200) can connect to the business support system 100 in the same way that it can connect to existing terminal apparatuses, so there is no need to change the external processing system architecture.

Additionally, the process of providing information about the above-described service information (account balances, sales campaign information and the like) to a customer is monitored by the above-described campaign manager 156, and depending on the results sales campaign information most likely to generate successful sales can be routed to such customer using the most effective channel.

It is also possible to spread the functions of the above-described business support system 100 among a plurality of servers. In that case, for example as shown in FIG. 8, a plurality of systems are integrated by a broad-channel bus.

Figure 8:
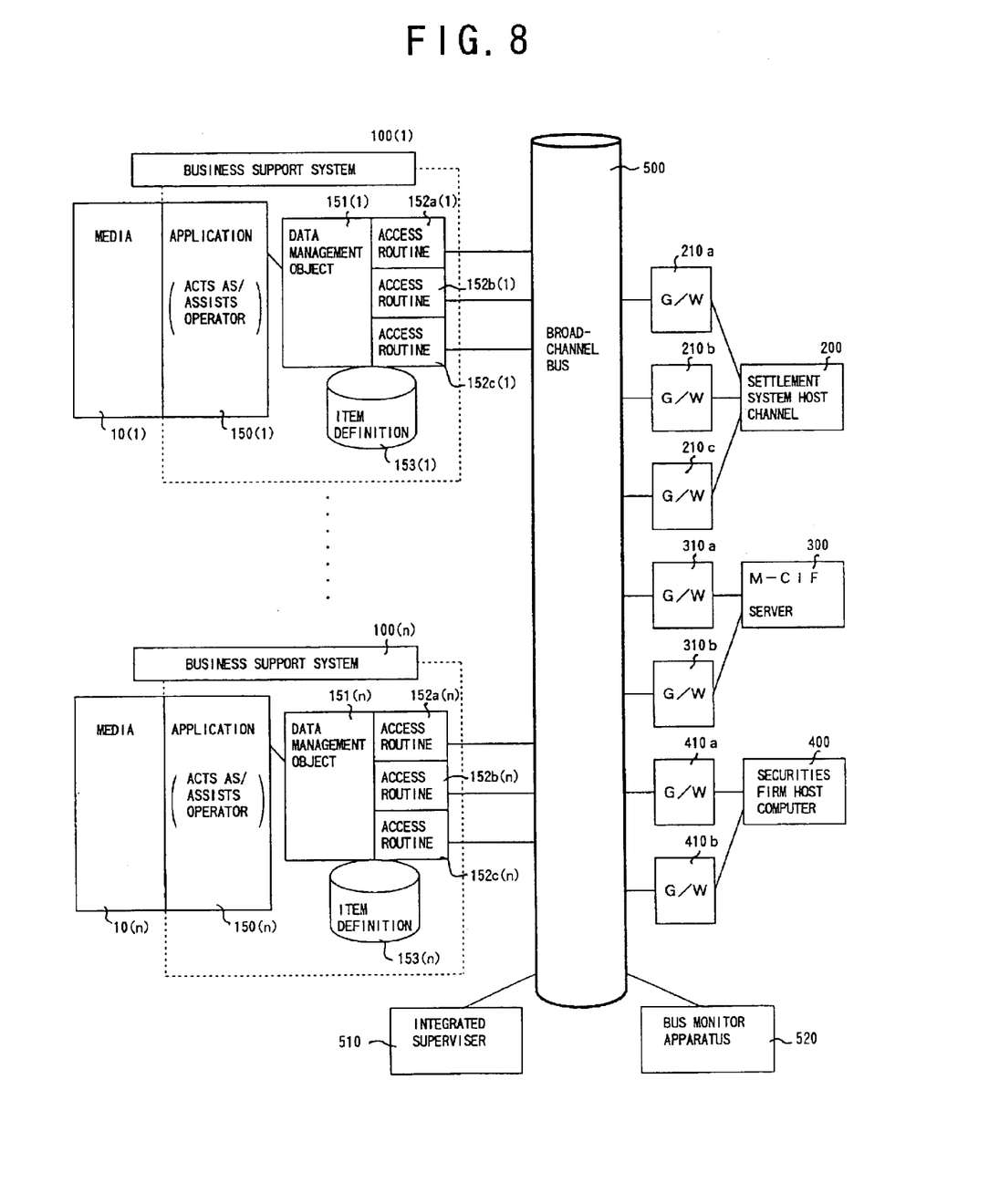
FIG. 8 is a structural block diagram of a configuration in which the functions of the business support system are dispersed.

In FIG. 8, the business support system 100 (1) through 100 (n) is dispersed, with the individual business support systems 100(*i*) (i=1-n), as shown in FIG. 3, having an application 150(*i*) connected to a media 10(*i*), a data management object 151(*i*), an access routine 152*a*(i) –152*c*(i) and an item definition 153(*i*). It should be noted that, though not shown in the drawing, as with the example shown in FIG. 3, each business support system 100(*i*) has a CRM agent and a campaign manager.

The business support system 100(*i*) access routines 152*a*(i)-152*c*(i) are connected in parallel to the broad-channel bus 500, and by this broad-channel bus 500 the business support systems 100(1)–100(*n*) are integrated. Further, gateways 210*a*–210*c* for converting protocol with the bank settlement system 200, gateways 310*a* and 310*b* for converting protocol with the data warehouse database 300, and gateways 410*a* and 410*b* for converting protocol with the securities firm host computer 400, are connected to this broad-channel bus 500. As a result, no matter what the business support system 100(*i*), it is possible to exchange data with the external processing system (bank settlement system 200, database 300 or securities firm host computer 400) via the broad-channel bus 500 and gateways.

Additionally, an integrated supervisor 510 for overall management of the dispersed system and a bus monitor apparatus 520 for monitoring the broad-channel bus 500 are also connected to the broad-channel bus 500.

Figure 9:
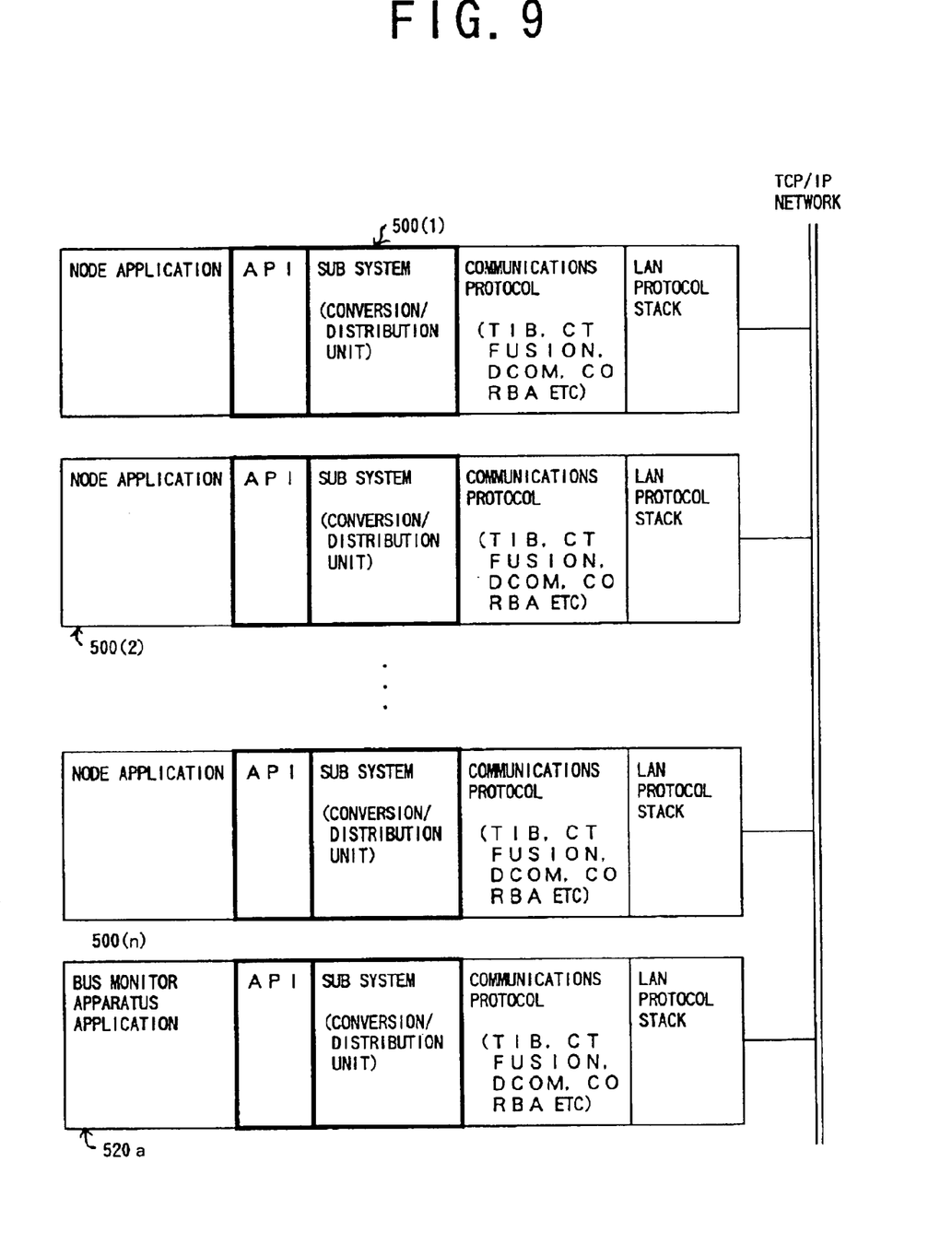
FIG. 9 is a functional block diagram of a broad-channel bus configuration.

The broad-channel bus 500 may for example have the functional configuration shown in FIG. 9. That is, the configuration is composed of units 500(1) through 500(*n*), each comprising a node application, a communications application programming interface (API), a bus system, a communications protocol and a LAN protocol, with each of the units 500(1) through 500(*n*) connected to the TCP/IP network. Additionally, the broad-channel bus 500 has a monitoring system 520*a* for managing a directory of addresses and other information corresponding to the bus monitor apparatus 520. This monitoring system 520*a* may be composed of a bus monitoring apparatus application, a communications API, a bus system, a communications protocol and a LAN protocol, and be connected to a TCP/IP network.

Figure 10:
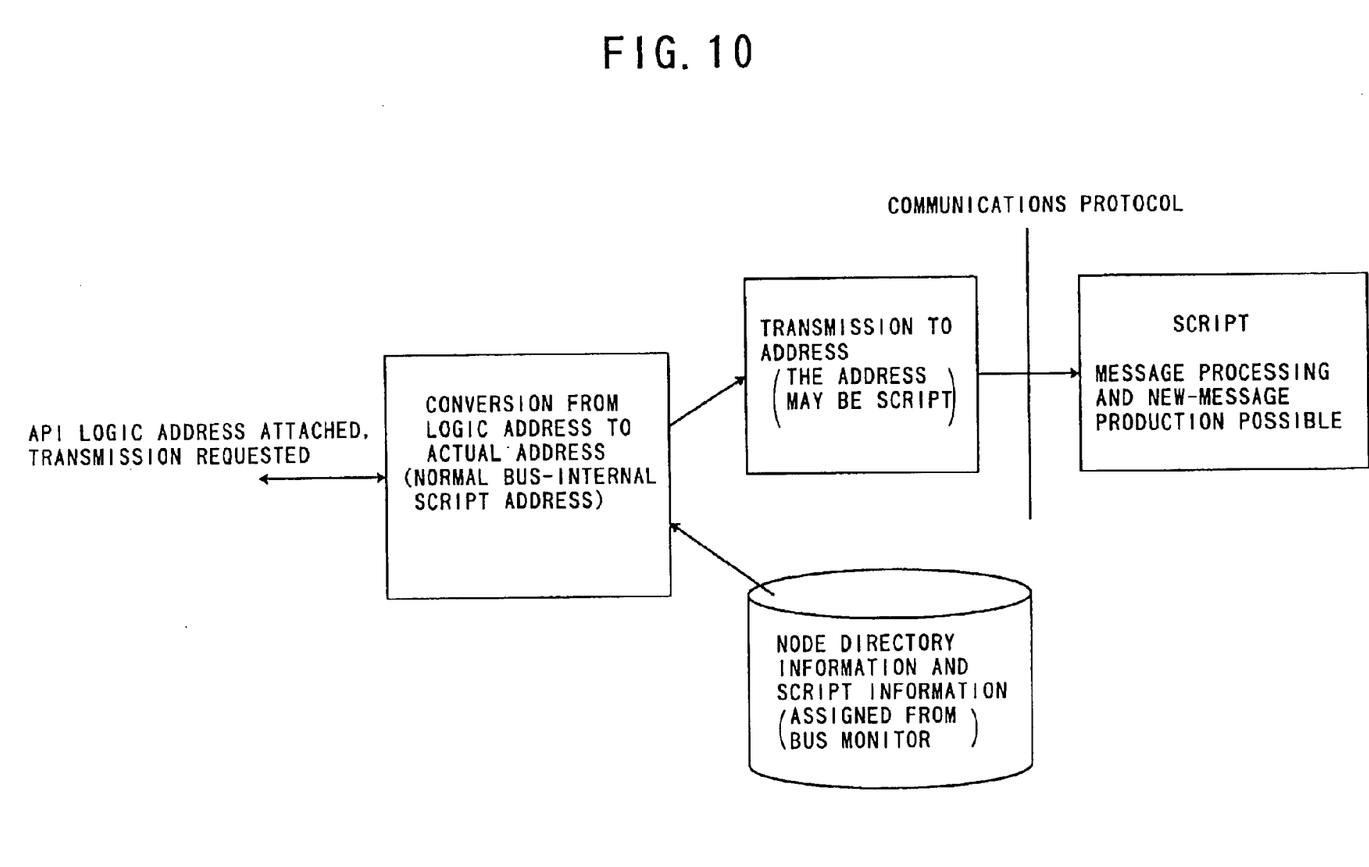
FIG. 10 is a functional block diagram of a bus system.

The bus system of the above-described units has the functional configuration shown in FIG. 10. That is, when the communications API makes a request to send or receive transmissions with logic addresses attached, the bus system converts the received logic address to an actual address (normal bus-internal script address) based on the node directory information and script information allotted from the bus monitor apparatus 520, and then transmits the information pertaining to the request to that address. This address may be a script. Depending on the script that is to be an address, it is possible to process the message or generate a new message.

Additionally, according to the business support system 100 described above (as per FIG. 2 and FIG. 3), it is possible to provide services to customers using steps like the following. The following example is of process steps in concluding a loan agreement with an internet user.

1) Database (M-CIF) 300 information (use channel frequency and customer designation) is examined dynamically, so that, for example, in the case of an internet user, information is sent by electronic mail.

2) By including a URL in that electronic mail, the user may click on that URL at the user's terminal apparatus and be promptly moved to the website (with SET security protocol, a balance statement issued internally terminates user identification).

3) The website HELP button automatically connects the user with the customer relation center.

Financing terms can be discussed and the content of the agreement finalized by talking with the customer over the telephone. The finalized agreement can then be sent to the customer's terminal apparatus (PC), where the customer can click a button signalizing agreement and automatically submitting the loan application.

During the call, the application undergoes a preliminary review by an automated review system.

Measures to record the conversation and conduct voice pattern identification at this time improves caller identification security and provides confirmation of the contents of the call, so possible legal trouble can be avoided.

4) Additionally, the loan application is generated automatically and thus automatically sent to the credit division for review.

5) Upon approval from the credit division, loan approval is sent automatically via electronic mail.

6) The repayment schedule and actual loan agreement are sent to the customer, without the customer ever having actually set foot in the bank.

7) The customer can get the money as soon as proper identification is obtained.

As described above, it is possible to conclude a loan agreement securely and accurately over the internet without the customer ever having to come into the bank to do so directly.

As described above, the business support system according to the present invention converts service information request data from a customer terminal apparatus into a form that can be processed by an external processing system, and also converts service information from the external processing system generated in response to the request into a form that can be processed within the business support system and provide that service information to the customer. As a result, the business support system can function as a system that provides to a terminal apparatus used by a customer the latest information held by an existing external processing system.

Additionally, in the business support system according to the present invention, the external processing system and the business support system are directly connected to each other, so the business support system can function as a system that allows information to be exchanged between the terminal apparatus and the external processing system.

What is claimed is:

1. A business support system connectable to a plurality of external processing systems that are external to the business support system and that have different protocols, the business support system comprising:

a plurality of service request production means corresponding to the plurality of external processing systems, respectively, each of the service request production means producing service information request data, in a predetermined form for a corresponding one of the plurality of external processing systems, in response to a request of a user from a terminal apparatus used by the user, the terminal apparatus being one of a plurality of different communication means;

a plurality of data form conversion means corresponding to the plurality of external processing systems, respectively, each of the data form conversion means converting the form of the service information request data produced by a corresponding one of the service request production means into a form that can be processed by a corresponding one of the external processing systems and also for converting service information provided from the corresponding one of the external processing systems in response to the service information request data into the predetermined form;

service information providing means for providing the service information converted into the predetermined form by one of the data form conversion means to the terminal apparatus originating the request for the service information;

data management means for managing the service information converted into the predetermined form by the one of the data form conversion means;

determining means for determining whether or not the service information is updated by accessing the corresponding external processing system;

accessing means accessing the corresponding external processing system to send the service information request data converted into the form that can be processed by the corresponding external processing system to obtain the service information with respect to the service information request data, when the determining means determines that the service information is not updated, wherein the service information obtained from the corresponding external processing system is converted into the predetermined form by the one of the data form conversion means, managed by the data management means, and provided to the terminal apparatus by the service information providing means.

2. The business support system as claimed in claim 1, further comprising:

sales campaign monitoring means for monitoring the effectiveness of a sales campaign based on the service information provided to users; and service information determining means for deciding which type of service information should be provided to users depending on the effectiveness of the monitored sales campaign.

3. The business support system as claimed in claim 2, further comprising service channel determining means for determining a providing means for providing service information to the users depending on the success rate of the monitored sales campaign.

4. The business support system as claimed in claim 3, further comprising adjusting means that ensures that no one providing means for providing service information determined by the service channel determining means is overloaded.

5. The business support system as claimed in claim 1, wherein the plurality of different communication means comprises a telephone, a facsimile machine, and a computer terminal.

6. The business support system as claimed in claim 1, wherein the plurality of different communication units comprises a telephone, a facsimile machine, and a computer terminal.

7. A business support system connectable to a plurality of external processing systems that are external to the business support system and that have different protocols, the business support system comprising:

a plurality of service request production units corresponding to the plurality of external processing systems, respectively, each of the service request production units producing service information request data, in a predetermined form for a corresponding one of the plurality of external processing systems, in response to a request of a user from a terminal apparatus used by the user, the terminal apparatus being a one of a plurality of different communication units;

a plurality of data form conversion units corresponding to the plurality of external processing systems, respectively, each of the data form conversion units converting the form of the service information request data produced by a corresponding one of the service request production units into a form that can be processed by a corresponding one of the external processing systems and also for converting service information provided from the corresponding one of the external processing systems in response to the service information request data into the predetermined form;

a service information providing unit providing the service information converted into the predetermined form by one of the data form conversion units to the terminal apparatus originating the request for the service information;

a data management unit managing the service information converted into the predetermined form by the one of the data form conversion units;

a determining unit determining whether or not the service information is updated by accessing the corresponding external processing system; and an accessing unit accessing the corresponding external processing system to send the service information request data converted into the form that can be processed by the corresponding external processing system to obtain the service information with respect to the service information request data, when the determining unit determines that the service information is not updated, wherein the service information obtained from the corresponding external processing system is converted into the predetermined form by the one of the data form conversion units, managed by the data management unit, and provided to the terminal apparatus by the service information providing unit.

8. The business support system as claimed in claim 7, further comprising:

a sales campaign monitoring unit monitoring the effectiveness of a sales campaign based on the service information provided to users; and a service information determining unit deciding which type of service information should be provided to users depending on the effectiveness of the monitored sales campaign.

9. The business support system as claimed in claim 8, further comprising a service channel determining unit providing service information to the users depending on the success rate of the monitored sales campaign.

10. The business support system as claimed in claim 8, further comprising an adjusting unit ensuring that no one service channel providing service information determined by the service channel determining unit is overloaded.

11. A business support system connectable to a plurality of external processing systems that are external to the business support system and that have different protocols, the business support system comprising:

- a plurality of service request production means corresponding to the plurality of external processing systems, respectively, each of the service request production means for producing service information request data in a predetermined form for a corresponding one of the external processing systems in response to a request of a user from a terminal apparatus used by the user, the terminal apparatus being one of a plurality of different communication means;
- a plurality of data form conversion means corresponding to the plurality of external processing systems, respectively, each of the data form conversion means converting the form of the service information request data produced by a corresponding one of the service request production means into a form that can be processed by a corresponding one of the external processing systems and also for converting service information provided from the corresponding one of the external processing systems in response to the service information request data into the predetermined form;
- service information providing means for providing the service information converted into the predetermined form by one of the data form conversion means to the terminal apparatus originating the request for the service information;
- data management means for managing the service information converted into the predetermined form by the one of the data form conversion means;
- determining means for determining whether or not the service information is undated by accessing the corresponding external processing system;
- accessing means accessing the corresponding external processing system to send the service information request data converted into the form that can be processed by the corresponding external processing system to obtain the service information with respect to the service information request data, when the determining means determines that the service information is not updated;
- wherein the service information obtained from the corresponding external processing system is converted into the predetermined form by the one of the data form conversion means, managed by the data management means, and provided to the terminal apparatus by the service information providing means;
- sales campaign monitoring means for monitoring the effectiveness of a sales campaign based on the service information provided to users;
- service information determining means for deciding which type of service information should be provided to users depending on the effectiveness of the monitored sales campaign; and
- service channel determining means for determining a providing means for providing service information to the users depending on the success rate of the monitored sales campaign.

* * * * *

UNITED STATES PATENT AND TRADEMARK OFFICE
CERTIFICATE OF CORRECTION

PATENT NO. : 6,868,390 B1
DATED : March 15, 2005
INVENTOR(S) : Takashi Shimada et al.

It is certified that error appears in the above-identified patent and that said Letters Patent is hereby corrected as shown below:

Title page,
Item [56], References Cited, FOREIGN PATENT DOCUMENTS, add:
-- JP     10-145451     5/1998
   JP     6-124309      5/1994. --.

Column 10,
Line 63, change "claim 8" to -- claim 9 --.

Column 12,
Line 2, change "undated" to -- updated --.

Signed and Sealed this

Eleventh Day of October, 2005

JON W. DUDAS
*Director of the United States Patent and Trademark Office*